(12) United States Patent
Richter

(10) Patent No.: US 9,682,603 B2
(45) Date of Patent: Jun. 20, 2017

(54) SYSTEM AND METHOD FOR ADJUSTING A WHEELCHAIR SEAT

(71) Applicant: Max Mobility, LLC, Antioch, TN (US)

(72) Inventor: Mark Richter, Nashville, TN (US)

(73) Assignee: Max Mobility, LLC, Antioch, TN (US)

( * ) Notice: Subject to any disclaimer, the term of this patent is extended or adjusted under 35 U.S.C. 154(b) by 0 days.

(21) Appl. No.: 14/590,129

(22) Filed: Jan. 6, 2015

(65) Prior Publication Data

US 2016/0101664 A1   Apr. 14, 2016

Related U.S. Application Data

(62) Division of application No. 14/511,799, filed on Oct. 10, 2014.

(51) Int. Cl.
| | |
|---|---|
| *B60G 17/0165* | (2006.01) |
| *A61G 5/04* | (2013.01) |
| *A61G 5/10* | (2006.01) |
| *B60G 99/00* | (2010.01) |

(52) U.S. Cl.
CPC ........... *B60G 17/0165* (2013.01); *A61G 5/04* (2013.01); *A61G 5/107* (2013.01); *A61G 5/1056* (2013.01); *A61G 5/1059* (2013.01); *A61G 5/1075* (2013.01); *A61G 5/1081* (2016.11); *B60G 99/002* (2013.01); *A61G 2203/42* (2013.01); *B60G 2300/24* (2013.01); *B60G 2400/0512* (2013.01); *B60G 2600/182* (2013.01); *B60G 2800/0192* (2013.01)

(58) Field of Classification Search
CPC . A61H 1/02; A61G 5/043; A61G 5/06; A61G 5/046; A61G 5/063; A47C 3/18; A47C 1/023; A63B 21/0552; A63B 21/00072; A63B 24/00
USPC ....... 701/124; 601/5; 280/649, 755; 248/371
See application file for complete search history.

(56) References Cited

U.S. PATENT DOCUMENTS

| | | | |
|---|---|---|---|
| 3,529,688 A | 9/1970 | Bruce | |
| 5,403,251 A * | 4/1995 | Belsito | A63B 24/00 345/173 |

(Continued)

OTHER PUBLICATIONS

Office Action mailed Jul. 14, 2014 for U.S. Appl. No. 14/053,047.

(Continued)

*Primary Examiner* — Yuri Kan
(74) *Attorney, Agent, or Firm* — McAndrews, Held & Malloy, Ltd.

(57) ABSTRACT

A wheelchair including a base assembly that has a first side and a second side. At least one caster and a drive wheel are mounted to each of the first and second sides. The wheelchair includes a seat assembly having a seat and a backrest and an actuator assembly having a plurality of actuators. Each actuator can expand and retract and includes a first end pivotably connected to the base assembly and a second end pivotably connected to the seat assembly. The actuator assembly allows for at least four degrees of movement of the seat assembly with respect to the base assembly. The wheelchair includes a computer that is connected to the actuators and that controls the movement of the actuators. The computer moves the actuators to vary the position of the seat assembly with respect to the base assembly.

5 Claims, 16 Drawing Sheets

(56) References Cited

U.S. PATENT DOCUMENTS

| | | | |
|---|---|---|---|
| 5,947,559 A * | 9/1999 | Williams | A47C 1/023 |
| | | | 297/337 |
| 5,964,473 A | 10/1999 | Degonda et al. | |
| 6,062,600 A | 5/2000 | Kamen et al. | |
| 6,206,393 B1 | 3/2001 | Mascari et al. | |
| 6,357,776 B1 | 3/2002 | Goertzen et al. | |
| 6,390,554 B1 | 5/2002 | Eakins et al. | |
| 6,425,635 B1 | 7/2002 | Pulver | |
| 6,976,699 B2 | 12/2005 | Koerlin | |
| 7,316,405 B2 | 1/2008 | Kritman et al. | |
| 7,516,984 B2 | 4/2009 | Tang | |
| 7,566,102 B2 | 7/2009 | Guile | |
| 7,569,002 B2 * | 8/2009 | Nativ | A63B 21/0552 |
| | | | 297/325 |
| 7,581,604 B2 | 9/2009 | Torita | |
| 7,635,164 B2 | 12/2009 | Torres et al. | |
| 8,061,755 B2 | 11/2011 | Brendel et al. | |
| 8,322,741 B2 | 12/2012 | Laslo et al. | |
| 8,474,848 B2 | 7/2013 | Bernatsky et al. | |
| 8,565,982 B2 | 10/2013 | Lofstrand | |
| 2004/0004390 A1 | 1/2004 | Guile | |
| 2004/0094944 A1 * | 5/2004 | Goertzen | A61G 5/043 |
| | | | 280/755 |
| 2005/0046129 A1 | 3/2005 | Antonishak et al. | |
| 2005/0280302 A1 | 12/2005 | Ropp | |
| 2006/0079817 A1 * | 4/2006 | Dewald | A61H 1/02 |
| | | | 601/5 |
| 2007/0152427 A1 * | 7/2007 | Olsen | 280/649 |
| 2007/0232464 A1 * | 10/2007 | Chu | A63B 21/00072 |
| | | | 482/96 |
| 2008/0097254 A1 | 4/2008 | Torres et al. | |
| 2011/0083915 A1 | 4/2011 | Nelson et al. | |
| 2012/0256459 A1 * | 10/2012 | Nilsson | A47C 3/18 |
| | | | 297/344.21 |
| 2013/0008732 A1 | 1/2013 | Richter | |
| 2014/0191489 A1 | 7/2014 | Kang et al. | |
| 2014/0262575 A1 | 9/2014 | Richter | |
| 2014/0339391 A1 * | 11/2014 | Hsu | A61G 5/046 |
| | | | 248/371 |

OTHER PUBLICATIONS

Office Action mailed Sep. 25, 2014 for U.S. Appl. No. 14/053,047.
Wikipedia website, http://en.wikipedia.org/wiki/Stewart_platform, Stewart platform, last modified on Aug. 2, 2014, printed from the Internet on Oct. 10, 2014, 3 pages.
Wikipedia website, http://en.wikipedia.org/wiki/Inertial_measurement_unit, Inertial measurement unit, last modified on Aug. 24, 2014, printed from the Internet on Oct. 10, 2014, 4 pages.
International Searching Authority mailed Oct. 23, 2015, for Application No. PCT/US2015/043534.

* cited by examiner

SYSTEM AND METHOD FOR ADJUSTING A WHEELCHAIR SEAT

RELATED APPLICATIONS

This application makes reference and claims priority to U.S. Non-Provisional patent application Ser. No. 14/511,799, filed on Oct. 10, 2014, titled "System And Method For Adjusting A Wheelchair Seat." U.S. Non-Provisional patent application Ser. No. 14/511,799 is hereby incorporated by reference in its entirety.

FIELD OF EMBODIMENTS OF THE INVENTION

Embodiments of the present invention generally relate to adjustable seats, and, more particularly, to adjustable seats for power wheelchairs.

BACKGROUND

A person in a manual wheelchair tends to lean forward when going up a sloped surface and lean backward when going down a sloped surface. This is a natural movement of the body done in order to adjust the position of the center of gravity of the user and the wheelchair so that the user keeps his or her balance in the seat. A person in a powered wheelchair, however, cannot lean to compensate for slopes in a surface because the seat of the power wheelchair follows the slope of the surface. Thus, when a power wheelchair goes down a slope, the user is effectively falling forward out of the seat. If the user is able, he or she pushes back on the arm rests of the wheelchair to stabilize himself or herself. However, even pushing on the arm rests to maintain balance can be difficult because the user may need to use at least one hand to control the joystick that operates the powered wheelchair. Thus, in some cases, the user of a power wheelchair may need to wear a chest harness to keep the user from falling out of the seat when traversing downward sloped surfaces. Moreover, when going uphill in a powered wheelchair, the user may be adequately stabilized because the seat is tilted backwards, but the user's frame of reference and equilibrium may be compromised because the user is forced into a reclined posture and line of sight.

There are conventional power wheelchairs that have seats that can be tilted backward and forward to compensate for uphill and downhill slopes. However, the user often will not be able to gauge how far to tilt the seat to compensate for the slope and, therefore, will not be able to find the best orientation for the seat, especially if the user is trying to drive the wheelchair at the same time the user is adjusting the angle of the seat. Moreover, even if the seat of the wheelchair can be tilted to maintain the user in an upright position, the tilting of the seat typically moves the center of gravity ("CG") of the user and seat to a less stable location. For example, with respect to mid-wheel drive power wheelchairs, the preferred location of the CG for purposes of stability is directly over the center of the drive wheels. However, when the seat of a mid-wheel drive wheelchair is tilted backward, the CG moves to a position behind the rear of the drive wheels. The seat is less stable when the CG is located behind the rear of the drive wheels.

Furthermore, the ability to tilt the seat backward or forward does not help stabilize the seat or improve the orientation of the seat when the wheelchair is traversing a side slope or uneven obstacle.

SUMMARY OF EMBODIMENTS OF THE INVENTION

Certain embodiments of the present invention provide a wheelchair including a base assembly having a first side and a second side, wherein on each of the first and second sides is mounted a caster and a drive wheel. The wheelchair also includes a seat assembly having a seat and a backrest. The wheelchair also includes an actuator assembly having a plurality of actuators. Each of the actuators can expand and retract and includes a first end pivotably connected to the base assembly and a second end pivotably connected to the seat assembly. The actuator assembly allows for at least four degrees of movement of the seat assembly with respect to the base assembly. The wheelchair includes a computer that is connected to the actuators and that controls the movement of the actuators. The computer moves the actuators to vary the position of the seat assembly with respect to the base assembly.

The actuator assembly of the wheelchair may include six actuators and allow for six degrees of movement of the seat assembly with respect to the base assembly.

The base assembly of the wheelchair may include a detector that measures the orientation of the base assembly with respect to the ground. The detector may be an inertial measurement unit chip. The detector is in communication with the computer and, based on changes in orientation of the base assembly measured by the detector, the computer moves the actuators to move the seat assembly to compensate for changes in the orientation of the base assembly.

The computer may cause the actuators to move the seat assembly linearly forward with respect to the base assembly and linearly backward with respect to the base assembly and, based on measurements taken by the detector during the forward and backward linear movements, the computer causes the actuator assembly to move the seat assembly such that the center of gravity of the seat assembly and a person in the seat assembly is located at a specific position with respect to the drive wheels.

The four degrees of movement provided by the actuator assembly may include rotating the seat assembly forward and backward along an axis that is parallel to a rotational axis of the drive wheels, rotating the seat assembly from left to right along a vertical axis that is perpendicular to the rotational axis of the drive wheels, linearly raising and lowering the seat assembly with respect to the base assembly, and linearly moving the seat assembly forward and backward with respect to the seat assembly.

Each of the actuators may be connected at one end to the seat assembly by a first ball joint and be connected at another end to the base assembly by a second ball joint.

Each of the casters may include a plurality of rollers along the circumference thereof that are rotatable about axes that are tangential to the circumference.

Certain embodiments of the present invention provide a wheelchair including a base assembly having a first side and a second side, wherein on each of the first and second sides is mounted a front caster, a rear caster, and drive wheel located between the front and rear casters. The wheelchair also includes a seat assembly having a seat and a backrest. The wheelchair also includes an actuator assembly having six actuators, wherein each of the actuators can expand and retract and includes a first end pivotably connected to the base assembly and a second end pivotably connected to the seat assembly. The actuator assembly allows for at least four degrees of movement of the seat assembly with respect to the base assembly. The wheelchair also includes a computer that is connected to the actuators and that controls the movement of the actuators. The computer moves the actuators to vary the position of the seat assembly with respect to the base assembly.

Certain embodiments of the present invention provide a method for adjusting the position of a wheelchair seat assembly. The method includes the step of providing a wheelchair that includes (i) a base assembly having a first side and a second side, wherein on each of the first and second sides is mounted a caster and a drive wheel, (ii) a seat assembly, (iii) a plurality of actuators connected to the base assembly and the seat assembly, wherein the actuators provide the seat assembly with at least four degrees of movement with respect to the base assembly, (iv) a computer that is connected to the actuators, and (v) a detector that measures the orientation of the base assembly.

The method further includes the step of the computer moving the actuators that the seat assembly moves linearly forward with respect to the base assembly. The method includes measuring a first change in the orientation of the base assembly due to the forward movement with the detector. The method includes moving the actuators such that the seat assembly moves linearly backward with respect to the base assembly. The method includes measuring a second change in the orientation of the base assembly due to the backward movement with the detector. The method includes sending the measurements of the first and second changes in orientation of the base assembly to the computer. The method includes using the measurements with the computer to move the actuators such that the seat assembly is moved to a position where the center of gravity of the seat assembly and a person in the seat assembly is located over a particular point with respect to the drive wheels.

Certain embodiments of the present invention provide a method for adjusting the position of a wheelchair seat assembly. The method includes the step of providing a wheelchair having (i) a base assembly including a first side and a second side, wherein on each of the first and second sides is mounted a caster and a drive wheel, (ii) a seat assembly, (iii) a plurality of actuators connected to the base assembly and the seat assembly, wherein the actuators provide the seat assembly with at least four degrees of movement with respect to the base assembly, (iv) a computer that is connected to the actuators, and (v) a detector that measures the orientation of the base assembly and that is connected to the computer.

The method further includes moving the drive wheels to drive the wheelchair over terrain. The method includes measuring the orientation of the base assembly with respect to the terrain with the detector as the wheelchair moves over the terrain and, when the orientation of the base assembly changes, sending information regarding the change in orientation from the detector to the computer. The method includes moving the actuators at the command of the computer to adjust the orientation of the seat assembly with respect to the base assembly to compensate for the change in the orientation of the base assembly based on the information regarding the change in orientation.

The method may also include positioning the seat assembly at a home orientation with respect to the ground and may include moving the seat assembly back to the home orientation if the change in orientation of the base assembly causes a change in the orientation of the seat assembly.

Figure 1:
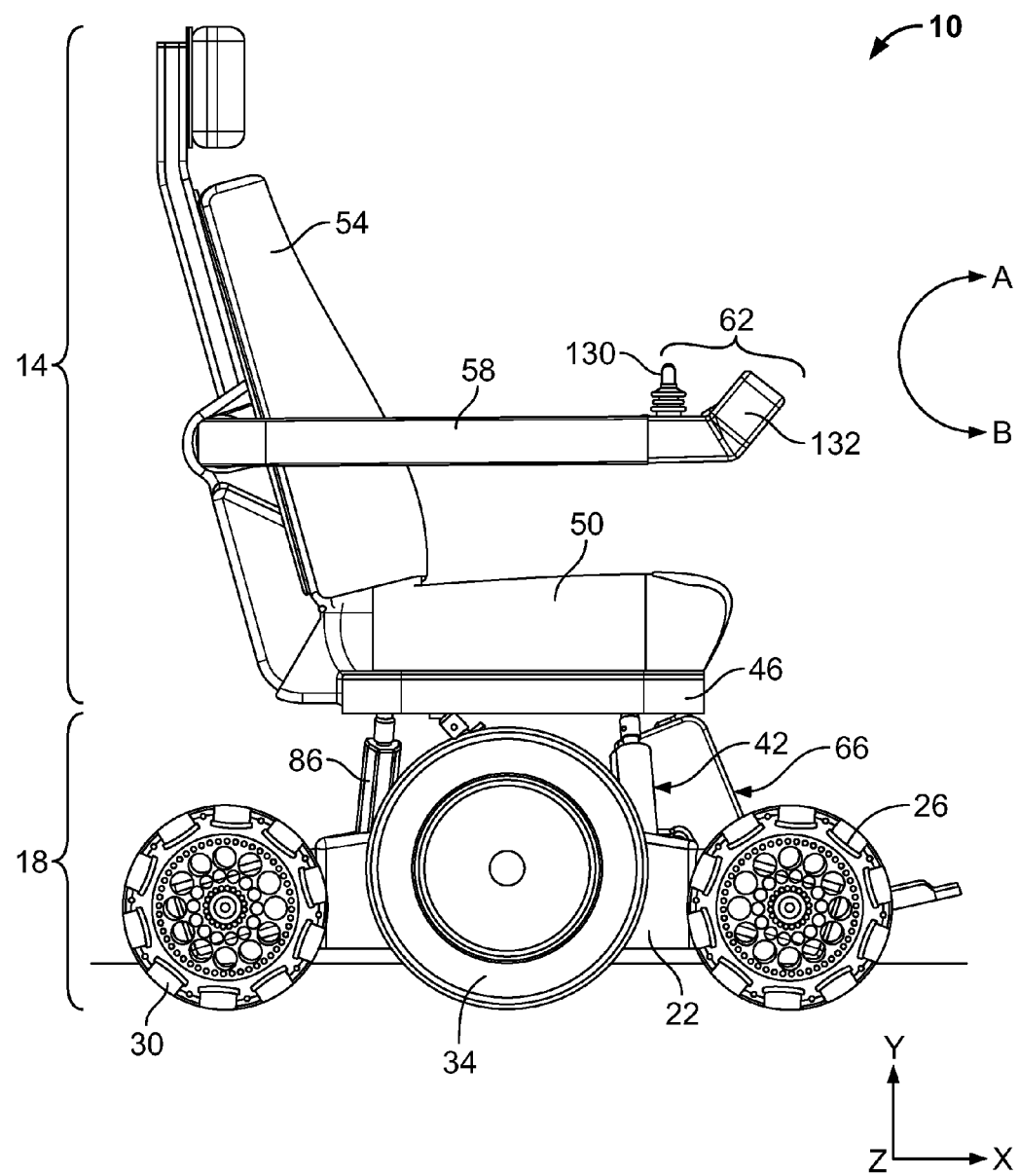
FIG. 1 illustrates a side view of a power wheelchair according to an embodiment of the invention.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE INVENTION

Figure 2:
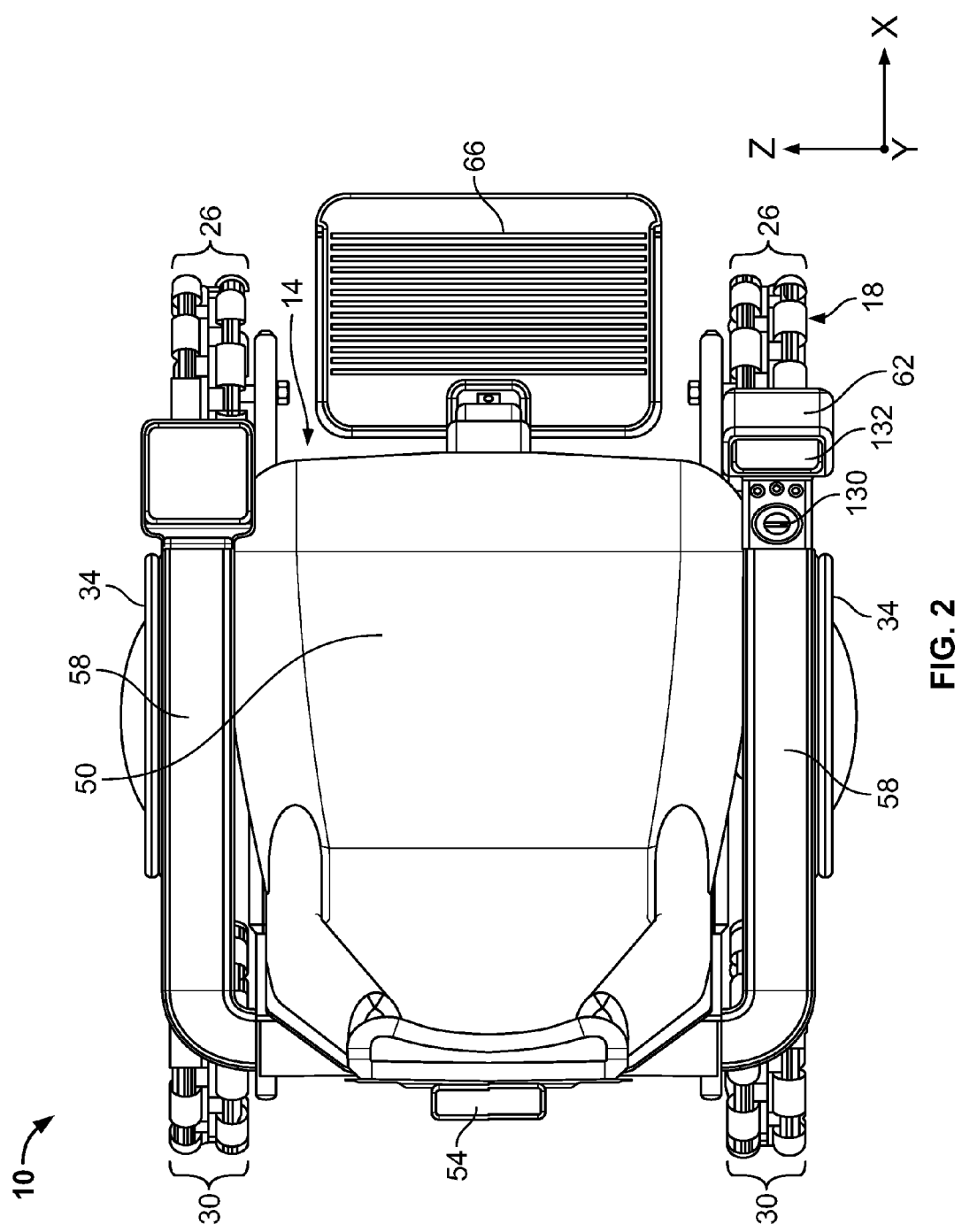
FIG. 2 illustrates a top view of the wheelchair of FIG. 1 according to an embodiment of the invention.

FIG. 1 illustrates a side view of a power wheelchair 10 according to an embodiment of the invention, and FIG. 2 illustrates a top view of the wheelchair 10. The wheelchair 10 includes a seat assembly 14 mounted to a base assembly 18. The base assembly 18 includes a chassis 22 to which is rotatably connected a pair of front caster wheels 26 and a pair of rear caster wheels 30. By way of example only, the front and rear caster wheels 26 and 30 have a ten inch diameter. A center drive wheel 34 is rotatably connected to each side of the chassis 22 between the front and rear caster wheels 26 and 30. Each drive wheel 34 is connected to a motor (not shown) which causes the drive wheel 34 to rotate forward and backward and thus move the wheelchair 10 forward and backward. The drive wheels 34 can be used to steer the wheelchair 10 by causing one drive wheel 34 to rotate faster than the other drive wheel 34. The wheelchair 10 is powered by batteries (not shown) that are mounted in the base assembly 18. By way of example only, the batteries are Lithium Iron Phosphate batteries.

The base assembly 18 also includes an actuator platform or assembly 42. The seat assembly 14 includes a base 46 that is mounted to the actuator assembly 42. A seat 50 and backrest 54 are mounted to the base 46. The seat 50 and backrest 54 may include cushions or padding upon which the body of the user rests. The backrest 54 is a power backrest that can be rotated forward and back in the direction of arrows A and B with respect to the base 46. An adjustable leg rest 66 extends downward from the base 46. By way of example, the height and angle of the leg rest 66 may be adjustable, and the leg rest 66 may be power adjustable. Arm rests 58 extend from the backrest 54 on each side of the seat 50. At least one of the arm rests 58 includes a control panel 62. The control panel 62 includes a joystick 130 and a touchscreen 132 that the user can use to operate the wheelchair 10. In particular, the control panel 62 can be used to, among other things, drive and steer the drive wheels 34, adjust the backrest 54, adjust the leg rest 66, and adjust the orientation of the seat assembly 14 with respect to the base assembly 18.

Figure 3:
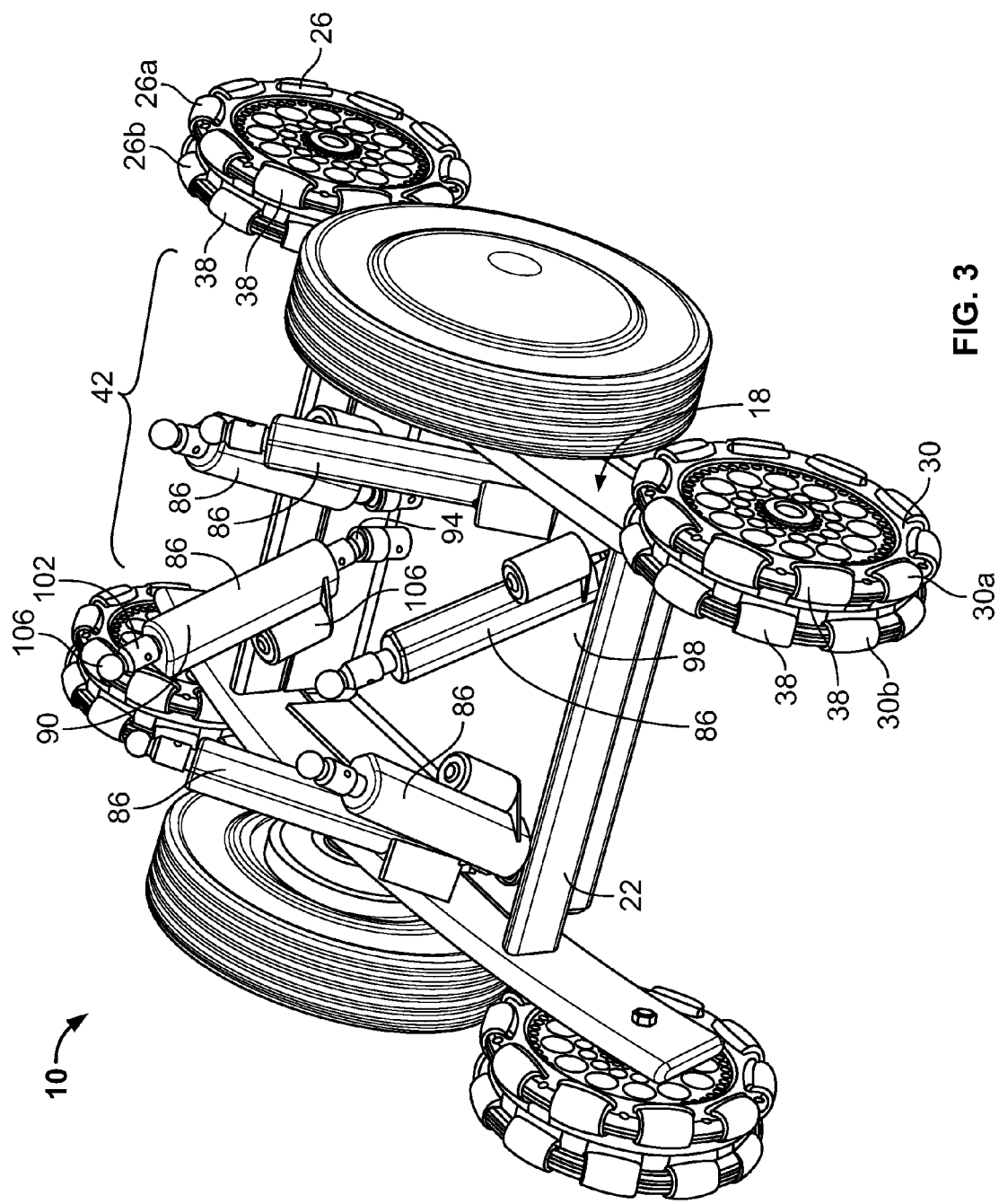
FIG. 3 illustrates a top isometric view of the base assembly of the wheelchair of FIG. 1.
Figure 4:
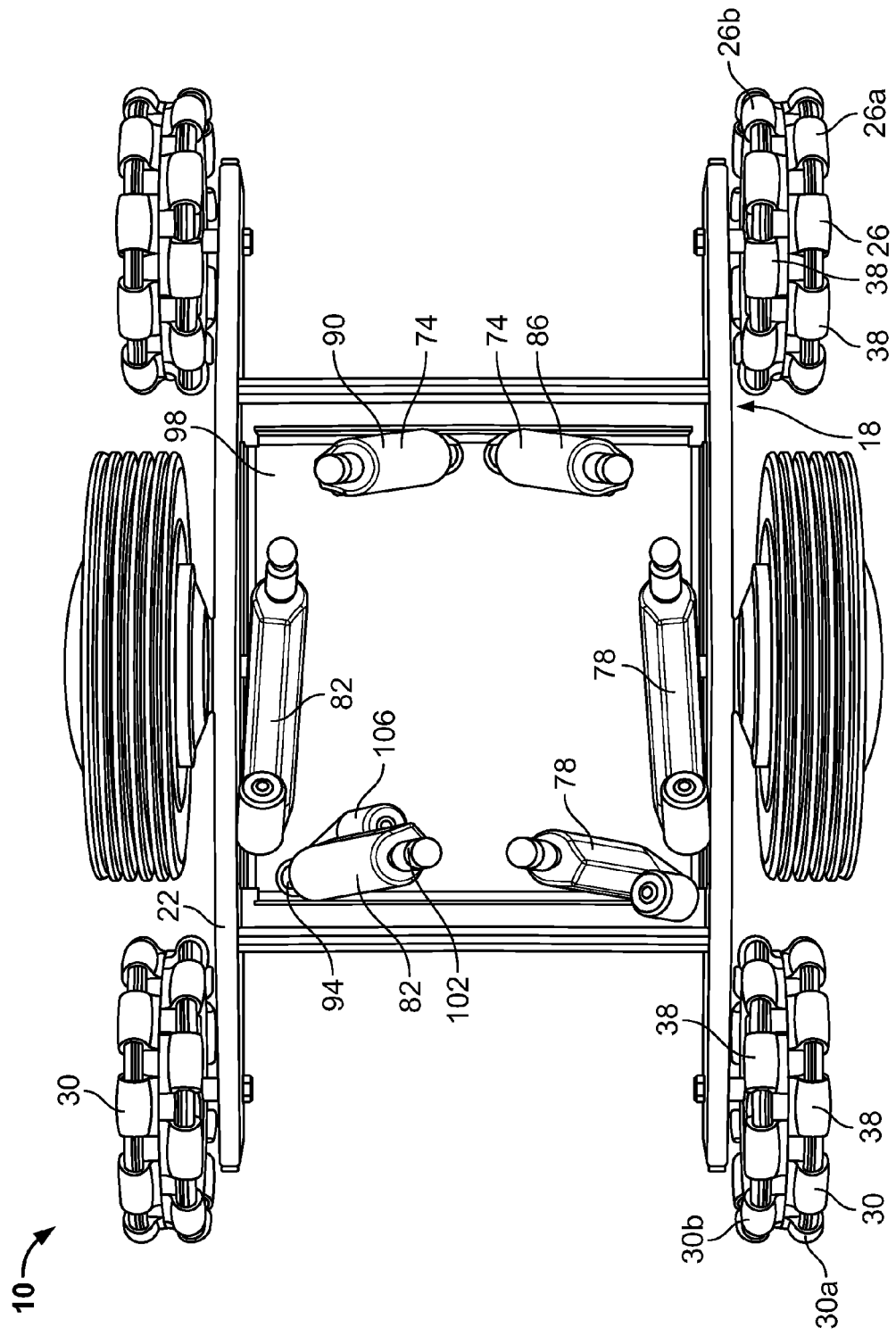
FIG. 4 illustrates a top view of the base assembly of the wheelchair of FIG. 1.

FIG. 3 illustrates a top isometric view of the wheelchair 10 of FIG. 1 with the seat assembly 14 removed, and FIG. 4 illustrates a top view of the wheelchair 10 of FIG. 3. The actuator assembly 42 includes six actuators 86 extending from a base 98 of the chassis 22. Each actuator 86 includes a cylindrical body 90 having a ball joint 94 at a bottom end thereof that is connected to the base 98 of the chassis 22. Each actuator 86 includes a rod 102 that can extend in and out of the body 90. The actuators 86 include motors 106 and, by way of example only, can be pneumatic, hydraulic, or electric actuators. With reference to FIG. 4, the actuators 86 are mounted in three pairs 74, 78, and 82 to the chassis 22 of the base assembly 18.

Figure 12:
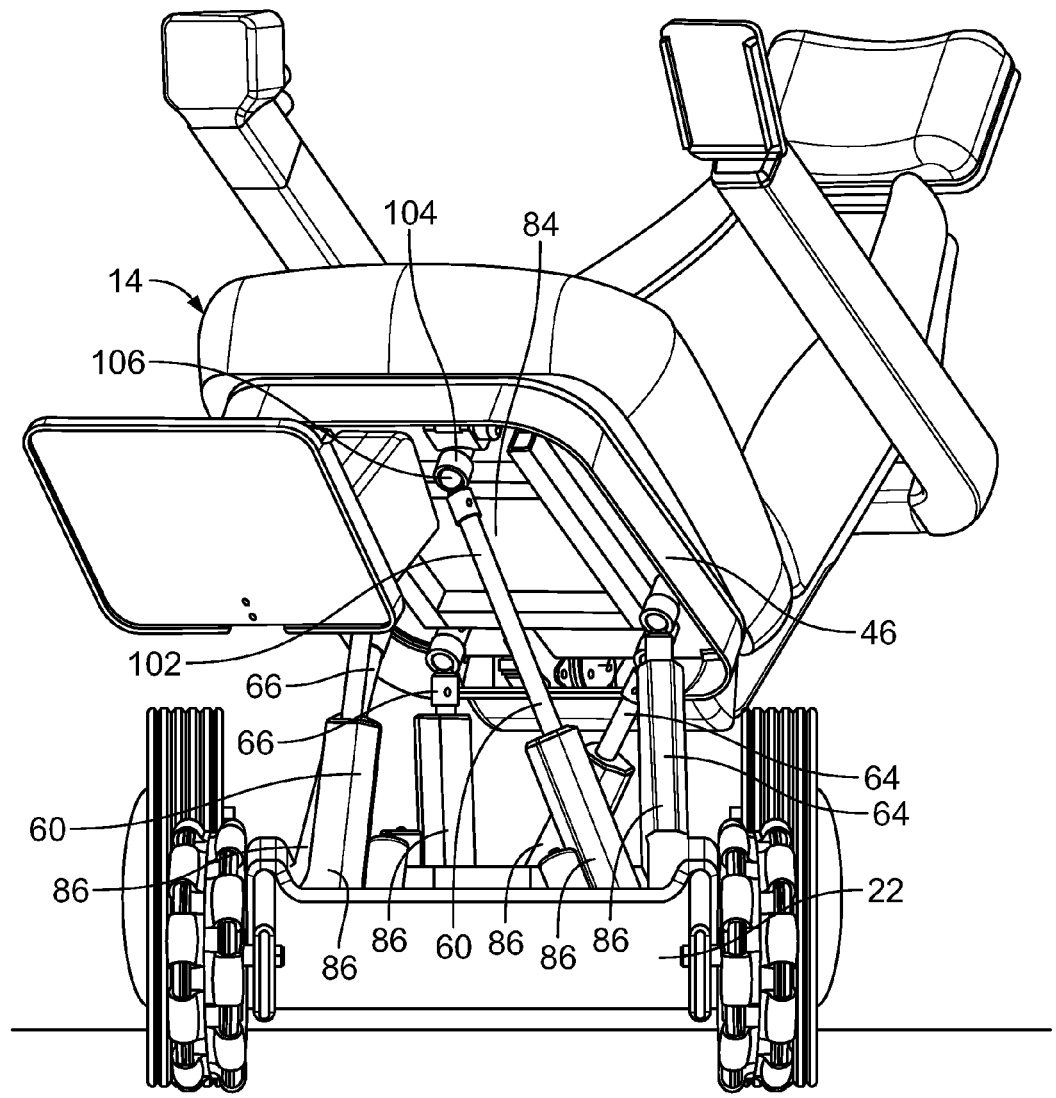
FIG. 12 illustrates a front view of the wheelchair of FIG. 1 with the seat assembly tilted backwards and rotated sideways.

As shown in FIG. 12, the actuators 86 extend upward from the chassis 22 and are connected to a bottom 84 of the base 46 of the seat assembly 14. The actuators 86 are connected in pairs 60, 64, and 66 on the bottom 84 of the base 46 of the seat assembly 14. With reference to FIGS. 3 and 12, none of the pairs 74, 78, and 82 include the same two actuators 86 that are included in any of the pairs 60, 64, and 66. That is, the actuators 86 cross over from one pair at base 98 of the chassis to form another pair at the base 46 of the seat assembly 14. Each rod 102 includes a bearing 106 that is configured to be received in a socket 104 on the bottom 84 of the base 46 of the seat assembly 14 to form a ball joint connection with the bottom of the base 46.

Referring to FIGS. 3 and 4, each of the front caster wheels 26 includes two wheels 26a and 26b, and each of the rear caster wheels 30 includes two wheels 30a and 30b. The wheels 26a, 26b, 30a, and 30b include side-facing lateral rollers 38. The lateral rollers 38 are positioned radially about the circumferences of the wheels 26a, 26b, 30a, and 30b. The lateral rollers 38 can be rotatable about axes that are tangential to the circumferences of the wheels 26a, 26b, 30a, and 30b such that, when wheels 26a, 26b, 30a, and 30b are placed on a surface, the wheels 26a, 26b, 30a, and 30b can freely slide in a direction parallel to the rotational axis of the front and rear caster wheels 26 and 30 while still on the ground. The lateral rollers 38 can also provide traction between the wheels 26a, 26b, 30a, and 30b and the ground. The lateral rollers 38 can be a cylindrical or barrel shape. The lateral rollers 38 may have a length approximately two times larger than their diameter. The wheels 26a, 26b, 30a, and 30b can include a different number of lateral rollers 38 depending on the size, shape, and intended operation of the wheels 26a, 26b, 30a, and 30b. For example, in certain embodiments, the front and rear caster wheels 26 and 30 can include eight or sixteen lateral rollers 38. The wheels 26a, 26b, 30a, and 30b and the rollers 38 may be made of a hard plastic or rubber.

The lateral rollers 38 can be arranged such that at least one lateral roller 38 is in contact with the ground when the one of the wheels 26a, 26b, 30a, and 30b is in contact with the ground. For example, the wheels 26a and 26b of a front caster wheel 26 can be offset such that at least one lateral roller 38 from one of the wheels 26a or 26b is in contact with the ground regardless of the rotational position of the front caster wheel 26. That is, in circumstances where the lowermost position of wheel 26a is a space between lateral rollers 38, then the lowermost position of wheel 26b will be a lateral roller 38 that is in contact with the ground. Alternatively, the front and rear caster wheels 26 and 30 can include only one wheel with rollers 38 instead of two wheels.

The axles of the front and rear caster wheels 26 and 30 have an aluminum core with sealed roller bearings pressed into place in the core. The front and rear caster wheels 26 and 30 include an over-molded rubber interface located between the inner core and a rigid exterior of the wheels 26 and 30. The rubber interface allows the rims of the front and rear wheels 26 and 30 to displace relative to the inner core when impacted by a sidewalk crack or other obstacle. The force-displacement properties of the rubber interface can be controlled by changing the durometer of the rubber interface.

Figure 5:
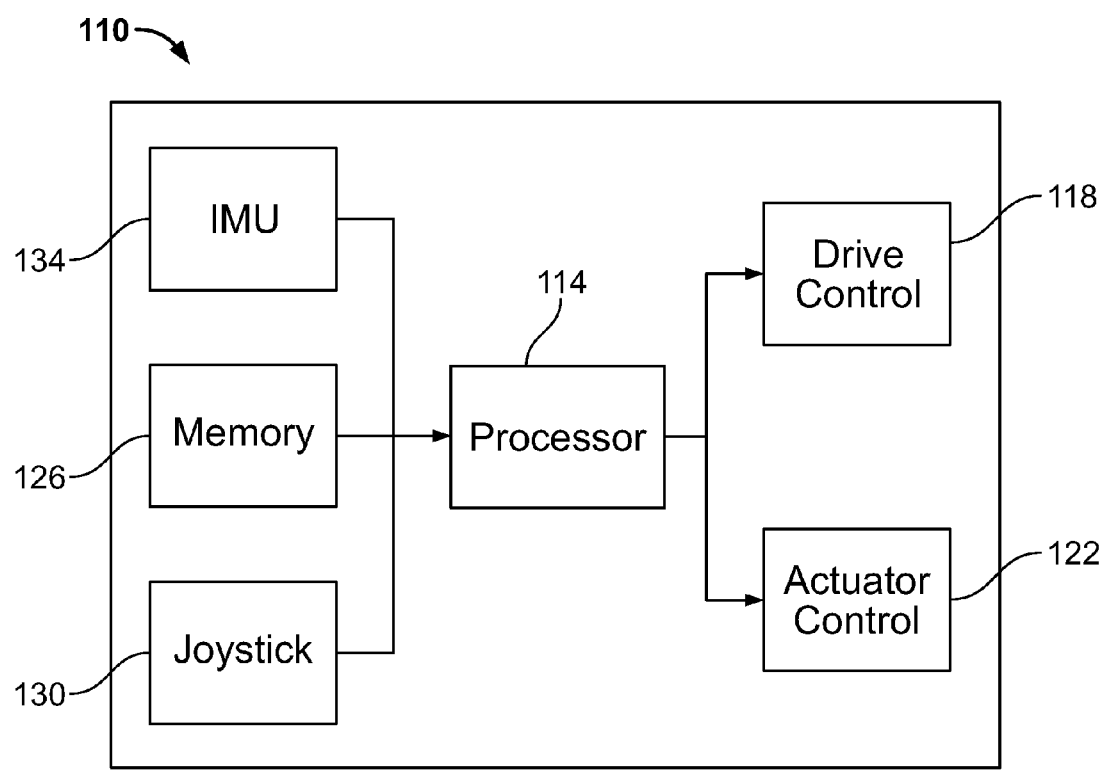
FIG. 5 illustrates a computer system used in the wheelchair of FIG. 1.

FIG. 5 illustrates an embodiment of a computer system 110 used in the wheelchair 10. The system 110 includes a processor 114 that communicates with a drive control 118 and an actuator control 122. The processor 114 may be located in the control panel 62 (FIGS. 1 and 2) of the wheelchair 10. The drive control 118 sends signals to and controls the motors connected to the drive wheels 34 (FIG. 1) in order to cause the drive wheels 34 to move forward and backward and steer the drive wheels 34. The actuator control 122 sends signals to and controls the motors 106 of each actuator 86 (FIGS. 3 and 4) to cause the rod 102 of each actuator 86 to extend or retract. The system 110 also includes a memory 126 that is connected to and in communication with the processor 114. The memory 126 stores programs that are run by the processor 114 and information received from other components in the computer system 110.

The system 110 also includes the joystick 130. The memory 126 and joystick 130 may be part of the control panel 62 (FIGS. 1 and 2). The joystick 130 is connected to and can send command signals to the processor 114. Other components of the control panel 62 (FIG. 1), such as the touchscreen 132, can also communicate with and send commands to the processor 114. The wheelchair user can use the joystick 130 to send signals to the processor 114 to control the drive control 118 to drive and steer the wheelchair 10. The system 110 also includes an Inertial Measurement Unit ("IMU") chip 134. The IMU chip 134 may be located in the base assembly 18 (FIG. 1) and is able to determine changes in linear and angular orientation of the base assembly 18 with respect to the ground. The IMU chip 134 is in communication with and sends signals to the processor 114. Alternatively, other devices, sensors, detectors, or methods besides an IMU chip that measure orientation could be used with the computer system 110 to determine changes in the orientation of the base assembly 18.

The memory, 126, joystick 130, and IMU 134 can communicate with the processor 114 through either a wired or wireless connection. Likewise, the processor 114 can communicate with the drive control 118 and actuator control 122 through either a wired or wireless connection.

Referring back to FIG. 1, the use of six actuators 86 in the actuator assembly 42 of the wheelchair 10 allows the seat assembly 14 of the wheelchair 10 to have six degrees of movement (three degrees of rotational movement and three degrees of translational movement) with respect to the base assembly 18. That is, with respect to the axes of FIG. 1, the user can use the control panel 62 to move the actuators 86 of the actuator assembly 42 such that the seat assembly 14 moves linearly along the X-axis (forward and backward), the Y-axis (upward and downward), and the Z-axis (left and right). The actuators 86 of the assembly 42 can also be operated to move the seat assembly 14 rotationally along the X-axis (roll), the Y-axis (yaw), and the Z-axis (pitch).

Figure 6:
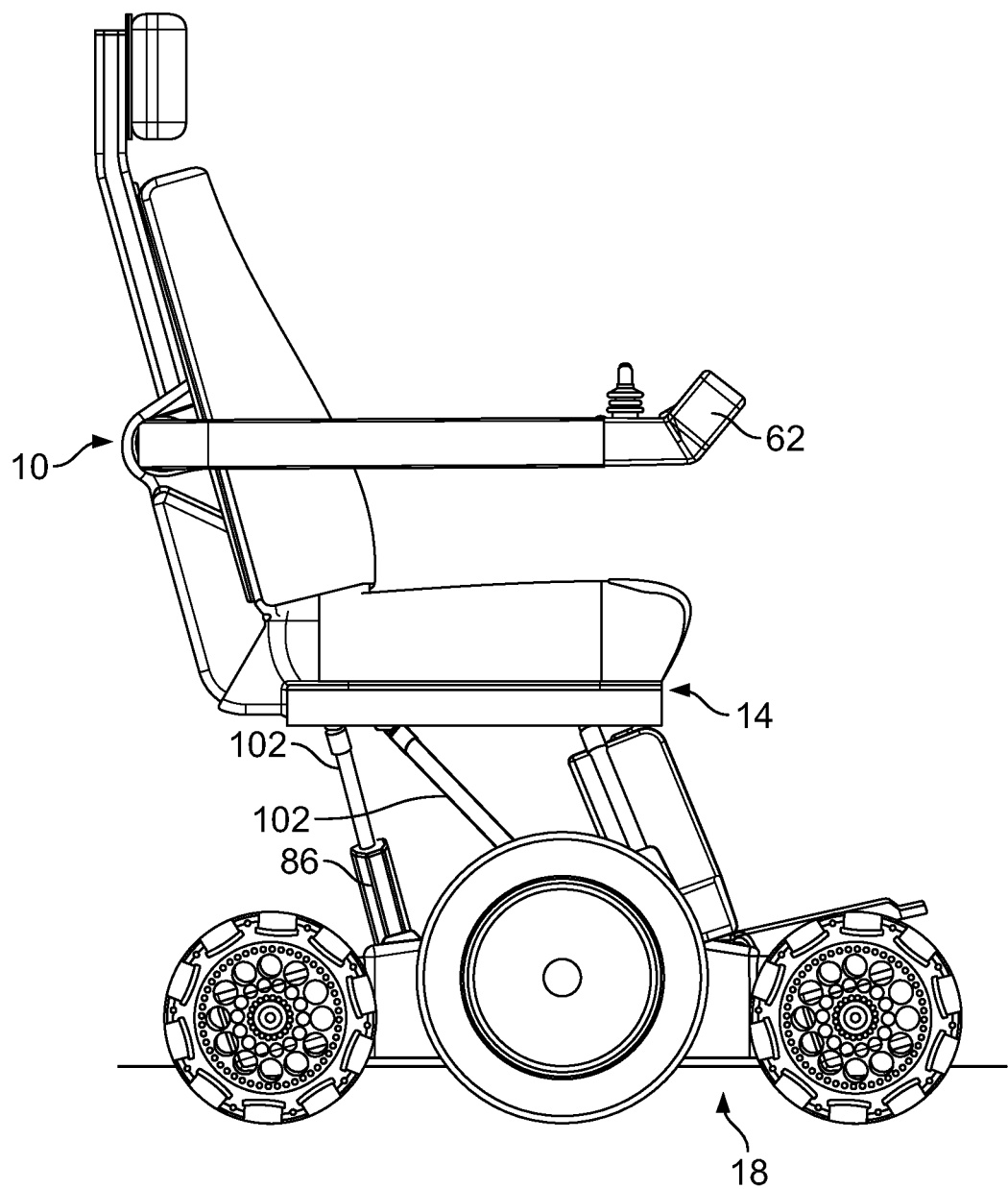
FIG. 6 illustrates a side view of the wheelchair of FIG. 1 with the seat assembly moved linearly backwards.
Figure 7:
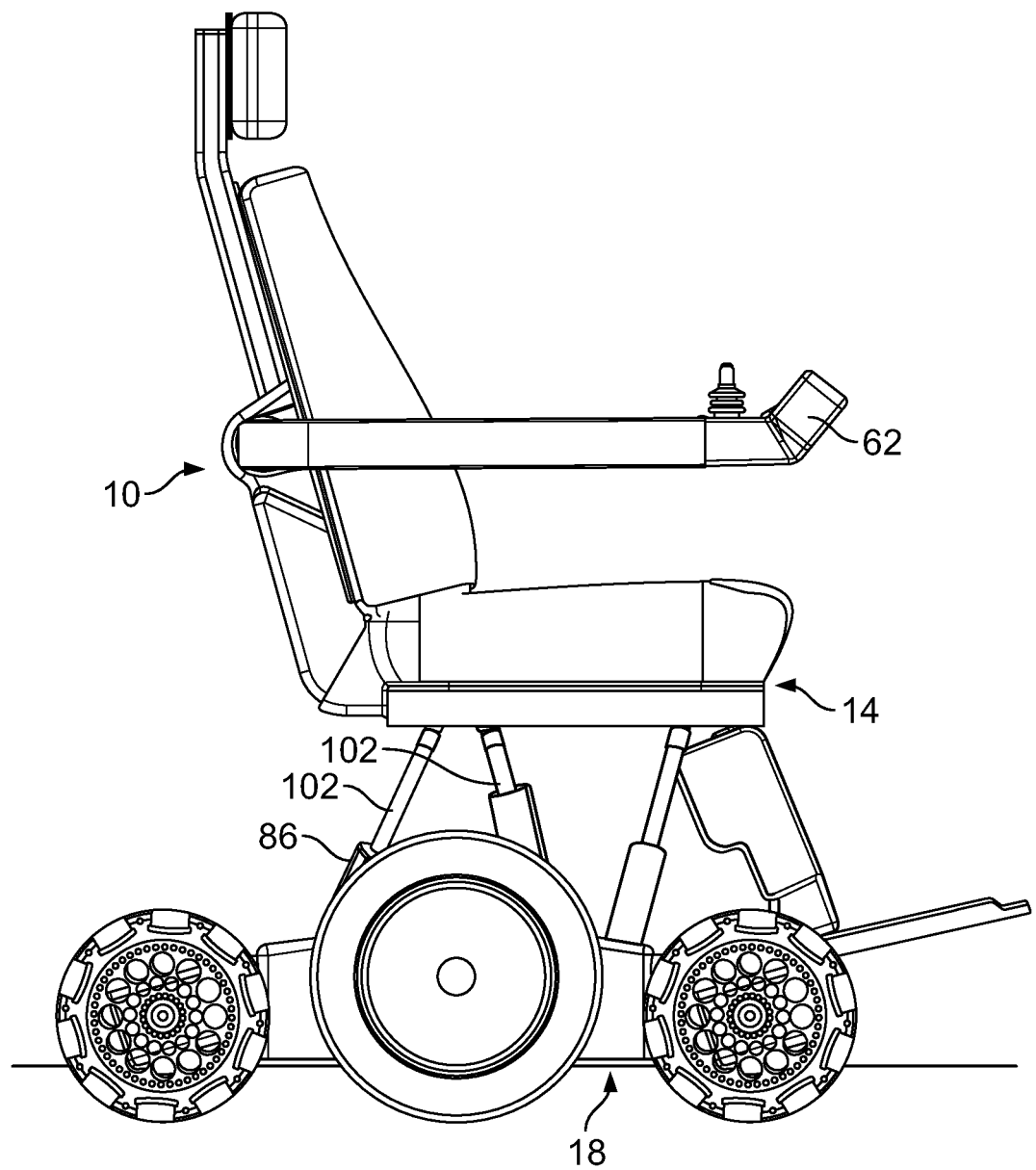
FIG. 7 illustrates a side view of the wheelchair of FIG. 1 with the seat assembly moved linearly forward.
Figure 8:
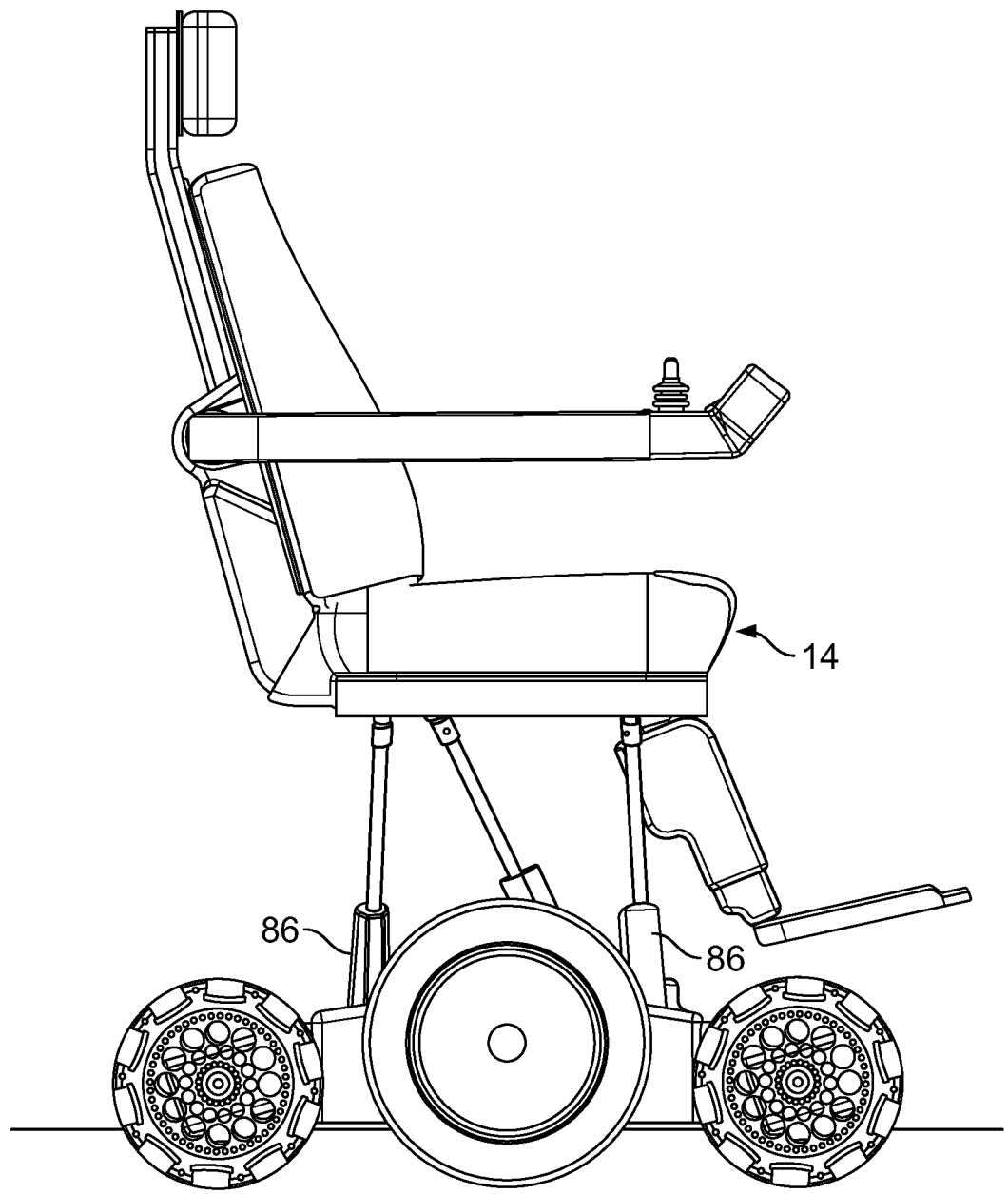
FIG. 8 illustrates a side view of the wheelchair of FIG. 1 with the seat assembly moved linearly upward.
Figure 9:
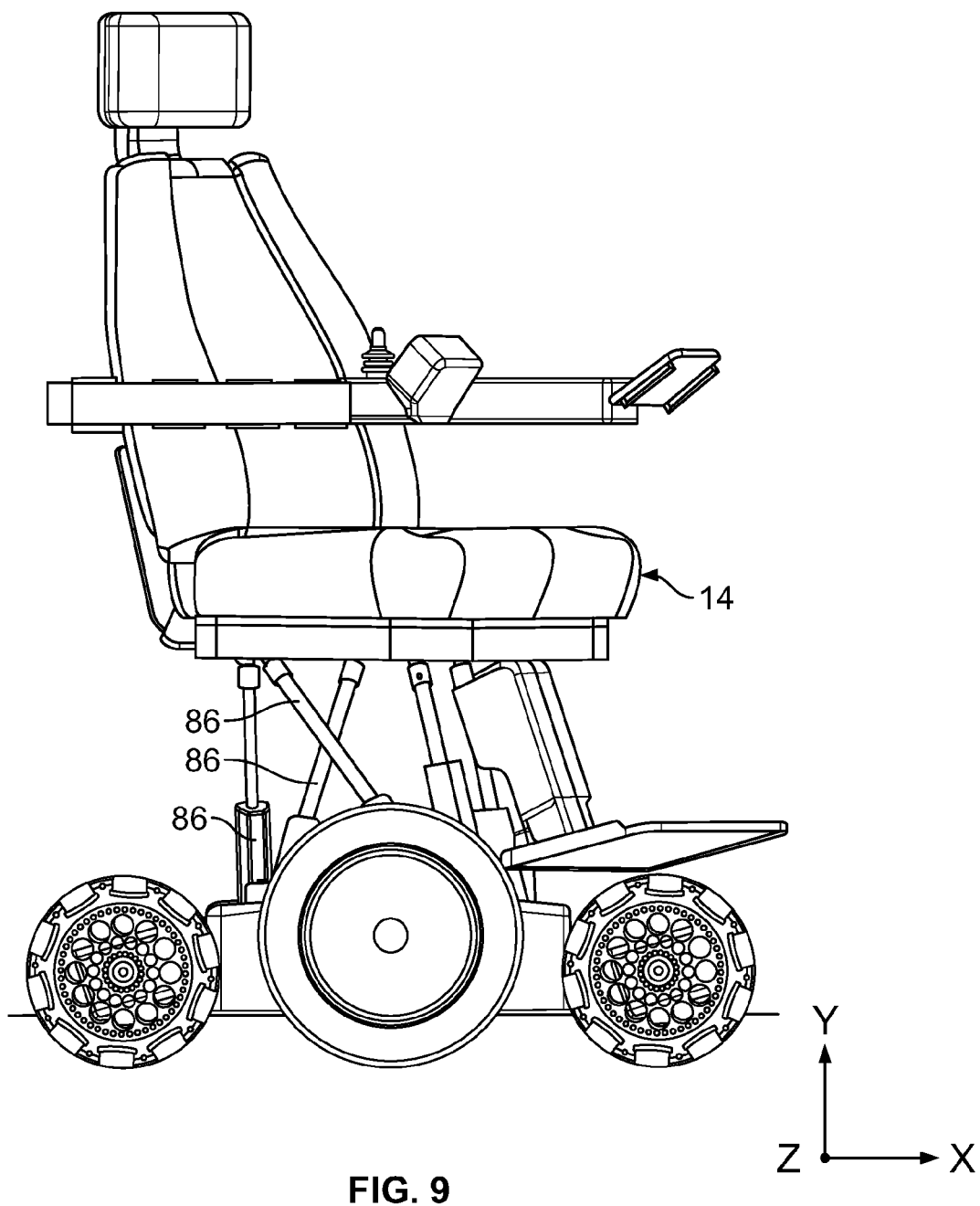
FIG. 9 illustrates a side view of the wheelchair of FIG. 1 with the seat assembly rotated sideways.
Figure 10:
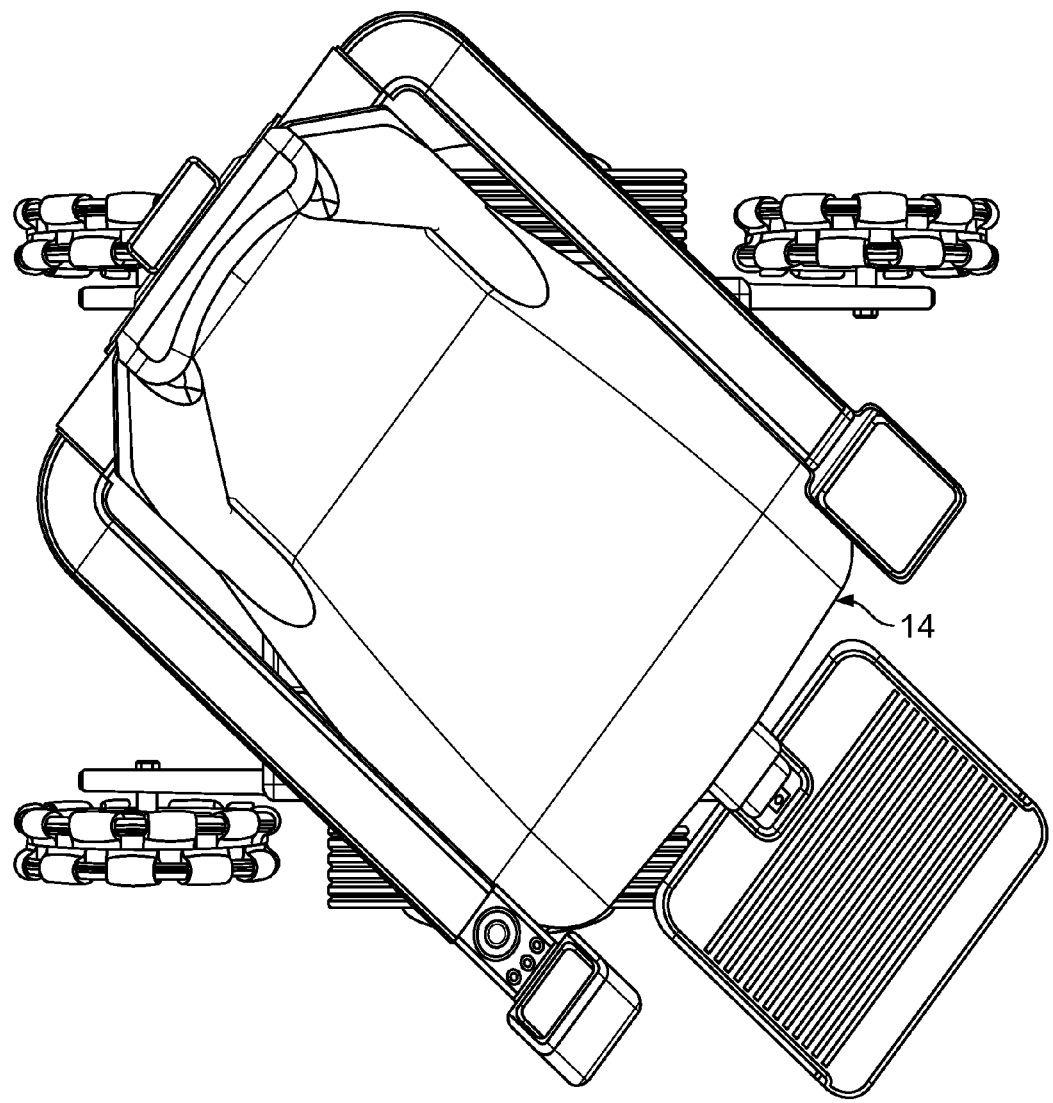
FIG. 10 illustrates a top view of the wheelchair of FIG. 9.
Figure 11:
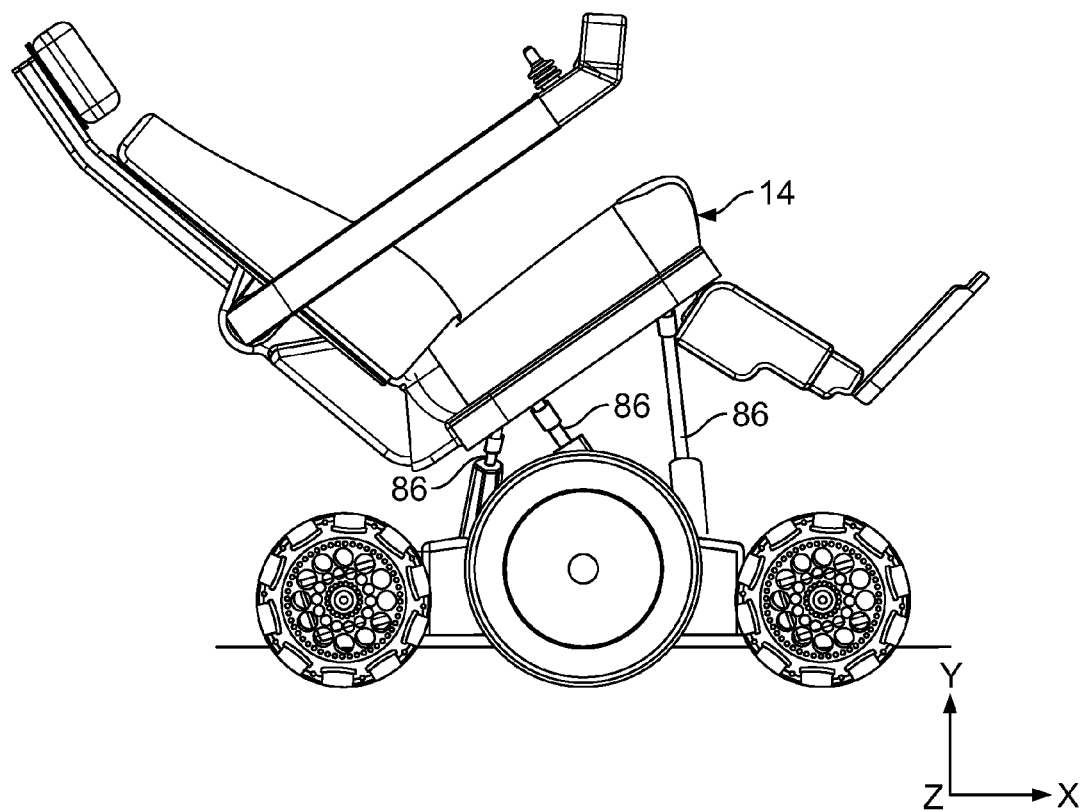
FIG. 11 illustrates a side view of the wheelchair of FIG. 1 with the seat assembly tilted backwards.
Figure 13:
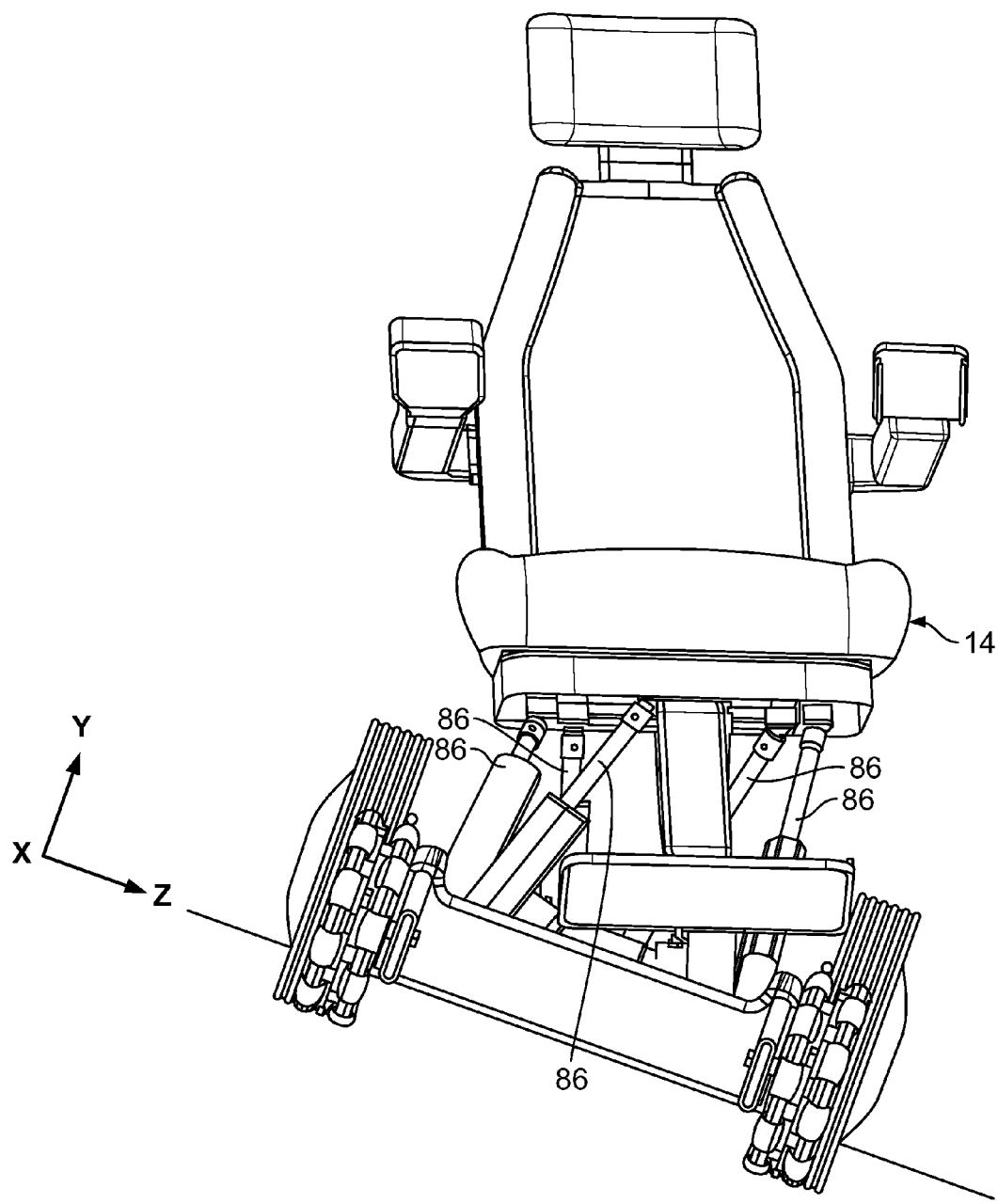
FIG. 13 illustrates a front view of the wheelchair of FIG. 1 with the seat assembly moved linearly sideways one way and rotated sideways the other way.

The actuators 86 can move the seat assembly 14 in a number of different combinations of degrees of freedom. For example, with respect to FIGS. 6 and 7, the user of the wheelchair 10 can use the control panel 62 to cause the rod 102 of each actuator 86 to extend and retract as needed to move the seat assembly 14 backward (FIG. 6) and forward (FIG. 7), respectively, with respect to the base assembly 18. With respect to FIG. 8, the actuators 86 can be controlled to lift the seat assembly 14 vertically upward. With respect to FIGS. 9 and 10, the actuators 86 can be controlled to rotate the seat assembly 14 forty degrees along the Y-axis. With respect to FIG. 11, the actuators 86 can be controlled to tilt the seat assembly 14 thirty-five degrees backward along the Z-axis, and, with respect to FIG. 12, the actuators 86 can be controlled to both tilt the seat assembly 14 along the Z-axis and rotate the seat assembly 14 along the Y-axis. With respect to FIG. 13, the actuators 86 can be controlled to both rotate the seat assembly 14 along the X-axis and move the seat assembly linearly along the Z-axis when the wheelchair 10 is driven along a cross slope.

In addition, with respect to FIGS. 1 and 2, the actuators 86 can be used to slide the seat assembly linearly along the Z-axis (i.e., to the left or the right) to better enable the user to be transferred to another wheelchair or a seat or bed.

As discussed above with respect to FIGS. 1-5, the position and orientation of the seat assembly 14 is controlled by changing, through the computer system 110, the lengths of the actuators 86 by extending or retracting the rods 102 of the actuators 86. The equations used to determine the appropriate length of each actuator 86 to achieve a desired seat position and orientation are shown below. The equations can be used to move the seat assembly 14 linearly relative to the base assembly 18 as well as to rotate the seat assembly 14 relative to the base assembly 18. These equations can be stored in the memory 126 of the computer system 110 and used by the processor 114 to move the actuators 86 to a specific position:

Vector $^sA_i=[A_{ix}\ A_{iy}\ A_{iz}]^2$ describes the position of the seat attachment point i (where i=1, 2 . . . 6) where the actuator 86 is connected to the bottom 84 of the seat base 46 (FIG. 12) {s}.

Vector $^bB_i=[B_{ix}\ B_{iy}\ B_{iz}]^1$ describes the position of the base attachment point i (where i=1, 2 . . . 6) where the actuator 86 is connected to the base 98 of the chassis 22 (FIG. 3) {b}.

From the IMU sensor 134 on the base assembly 18, Euler angles ($\varnothing_x, \varnothing_y, \varnothing_z$) are known. Thus, the rotation matrix is $$T = T_z T_y T_x =$$

$$\begin{bmatrix} \cos\varnothing_z\cos\varnothing_y & \cos\varnothing_z\sin\varnothing_y\sin\varnothing_x - \sin\varnothing_z\cos\varnothing_x & \cos\varnothing_z\cos\varnothing_x\sin\varnothing_y + \sin\varnothing_z\sin\varnothing_x \\ \sin\varnothing_z\cos\varnothing_y & \sin\varnothing_x\sin\varnothing_y\sin\varnothing_z + \cos\varnothing_z\cos\varnothing_x & \sin\varnothing_z\cos\varnothing_x\sin\varnothing_y - \cos\varnothing_z\sin\varnothing_x \\ -\sin\varnothing_y & \cos\varnothing_y\sin\varnothing_x & \cos\varnothing_y\cos\varnothing_x \end{bmatrix}$$

With height being h, the equation for moving the seat from $[0\ 0\ 0]^T$ to $[x\ y\ x]^T$ is as follows:

$$^bA_i = T^sA_i + [x,y,z+h]^T$$

The vector of all actuator rods 102 is $^bl_i = ^bA_i - ^bB_i$, and the length of all rods 102 is $$l_i = \sqrt{^bl_i^T \cdot ^bl_i}$$

In addition to allowing the user of the wheelchair 10 control the actuators 86 directly via the control panel 62 to adjust the position of the seat assembly 14, the computer system 110 of the wheelchair 10 can automatically adjust the positioning of the seat assembly 14 to keep the user in an upright position and maintain the center of gravity of the user and the seat assembly 14 in a desirable location as the wheelchair 10 traverses various kinds of inclines and obstacles.

Figure 14:
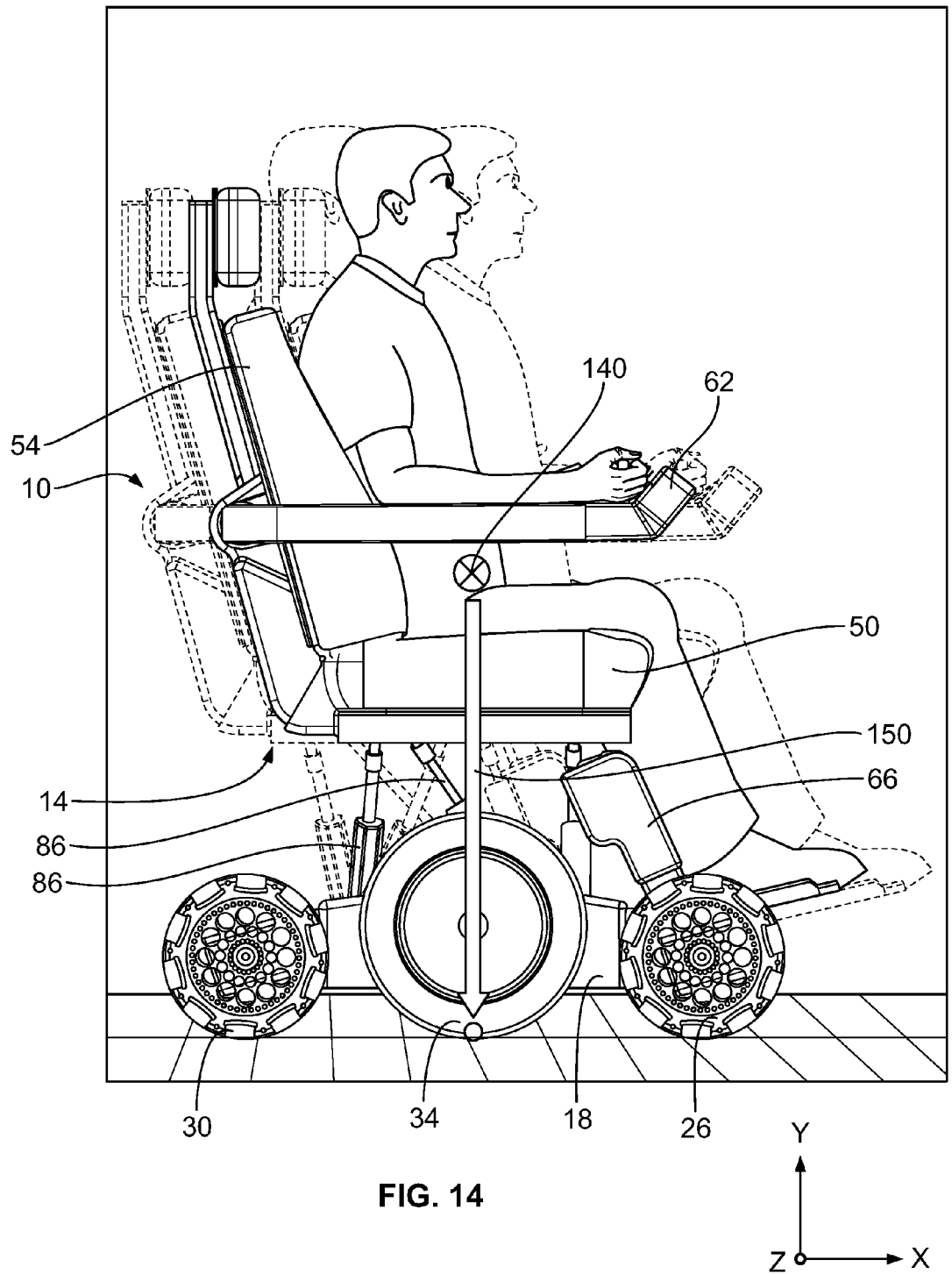
FIG. 14 illustrates a side view of the wheelchair of FIG. 1 with a user seated in the wheelchair and the seat assembly moving linearly forward and backward.

With reference to FIG. 14, as part of the process of fitting the wheelchair 10 for a user, a clinician or other qualified personnel helps the wheelchair user find a preferred default or "home" orientation for the seat assembly 14 by adjusting the positions of the backrest 54, seat 50, and leg rest 66. Typically, the home orientation puts the user in an upright position as shown in FIG. 14. Once the home orientation for the seat assembly 14 is determined, the user or clinician uses the control panel 62 to move the seat assembly 14 linearly along the X-axis until the center of gravity ("CG") 140 of the user and seat assembly 14 is positioned above the center (indicated by center line 150) of the drive wheels 34. Such a position is typically the safest and most stable position for the user. This position of the seat assembly 14 is saved in the memory 126 of the computer system 110 (FIG. 5).

The process for locating the CG 140 during the fitting process and positioning the CG 140 over the drive wheels 34 is as follows. The user is positioned in the seat 50 with the seat assembly 14 in the home orientation, and the control panel 62 is used to command the processor 114 (FIG. 5) to sends a signal to the actuator control 122 (FIG. 5) to cause the actuators 86 to move the seat assembly 14 linearly forward and then linearly backward along the X-axis, as shown in FIG. 14. Because the front and rear caster wheels 26 and 30 have suspensions, as the seat assembly moves forward, the CG 140 of the user and seat assembly 14 moves toward a position above the front of the drive wheels 34 and the base assembly 18 tips forward. Similarly, as the seat assembly moves backward, the CG 140 moves to a position above the rear of the drive wheels 34 and the base assembly 18 tips backward. The IMU 134 (FIG. 5) monitors the orientations of the base assembly 18 during the forward and backward tipping movements, and sends the orientation information to the processor 114. The processor 114 uses the orientation information to determine when the CG 140 of the seat assembly 14 and user is located directly above the center of the drive wheels 34 and moves the seat assembly 14 such that the CG is positioned above the center of the drive wheels 34. This location is the X-axis component of the CG 140.

It will be understood that the step of locating and positioning the CG 140 may need to be repeated over time. For example, the default home orientation may need to be changed or additional equipment may be added to the seating assembly 14 that affect the location of the CG. In such cases, the CG will again have to be re-located and re-positioned over the drive wheels 34. In addition, unplanned changes that could alter the CG 140 over time, such as weight gain, can be monitored, and the computer system 110 of the wheelchair 10 can automatically adjust the position of the seat assembly in response to such changes to reposition the CG over the center of the drive wheels 34. The computer system 110 of the wheelchair 10 can store a running history of fore and aft angles of the base assembly 18 over time. If the average of the angles deviates from zero, the processor 114 can automatically adjust the seating assembly 14 by way of the forward and rearward translational movement step discussed above to re-position the seating assembly 14 such that the CG 140 is directly above the center of the drive wheels 34. Alternatively, the processor 114 could provide an indicator to the user through the control panel 62 that the wheelchair needs to have the CG 140 position recalibrated.

Figure 15:
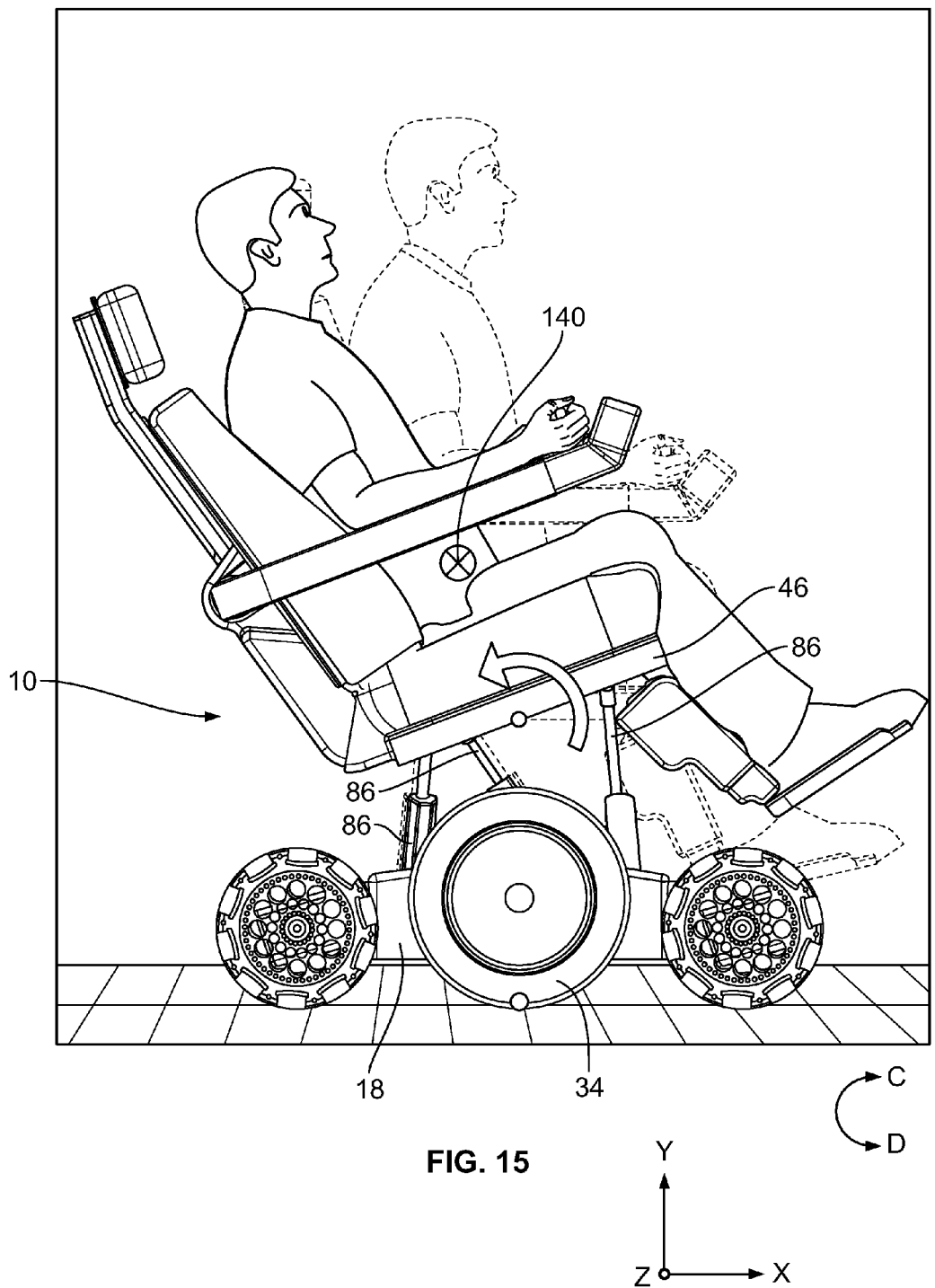
FIG. 15 illustrates a side view of the wheelchair of FIG. 14 with the seat assembly tilting backward.

In addition to being able to automatically find the CG 140 during the fitting process, the computer system 110 of the wheelchair 10 can also automatically adjust the seating assembly 14 of the wheelchair 10 as the wheelchair 10 goes over obstacles or slopes. With reference to FIG. 15, when the user activates the drive wheels 34 of the wheelchair 10 to drive the wheelchair 10 over a flat surface, the IMU chip 134 (FIG. 5) monitors the orientation of the base assembly 18. When the wheelchair 10 encounters uneven terrain, such as a slope or obstacle, that causes the orientation of the base assembly 18, and thus the IMU chip 134, to change, the IMU chip 134 sends a signal to the processor 114 (FIG. 5) informing the processor 114 of the change to the orientation of the IMU chip 134. The processor 114 uses this information, along with programs stored in the memory 126 (FIG. 5), to send a signal to the actuator control 122 (FIG. 5) to cause the actuators 86 to move the seating assembly 14 to compensate for the change in the terrain such that the seating assembly 14 is moved back to the home orientation with respect to the ground.

Figure 16:
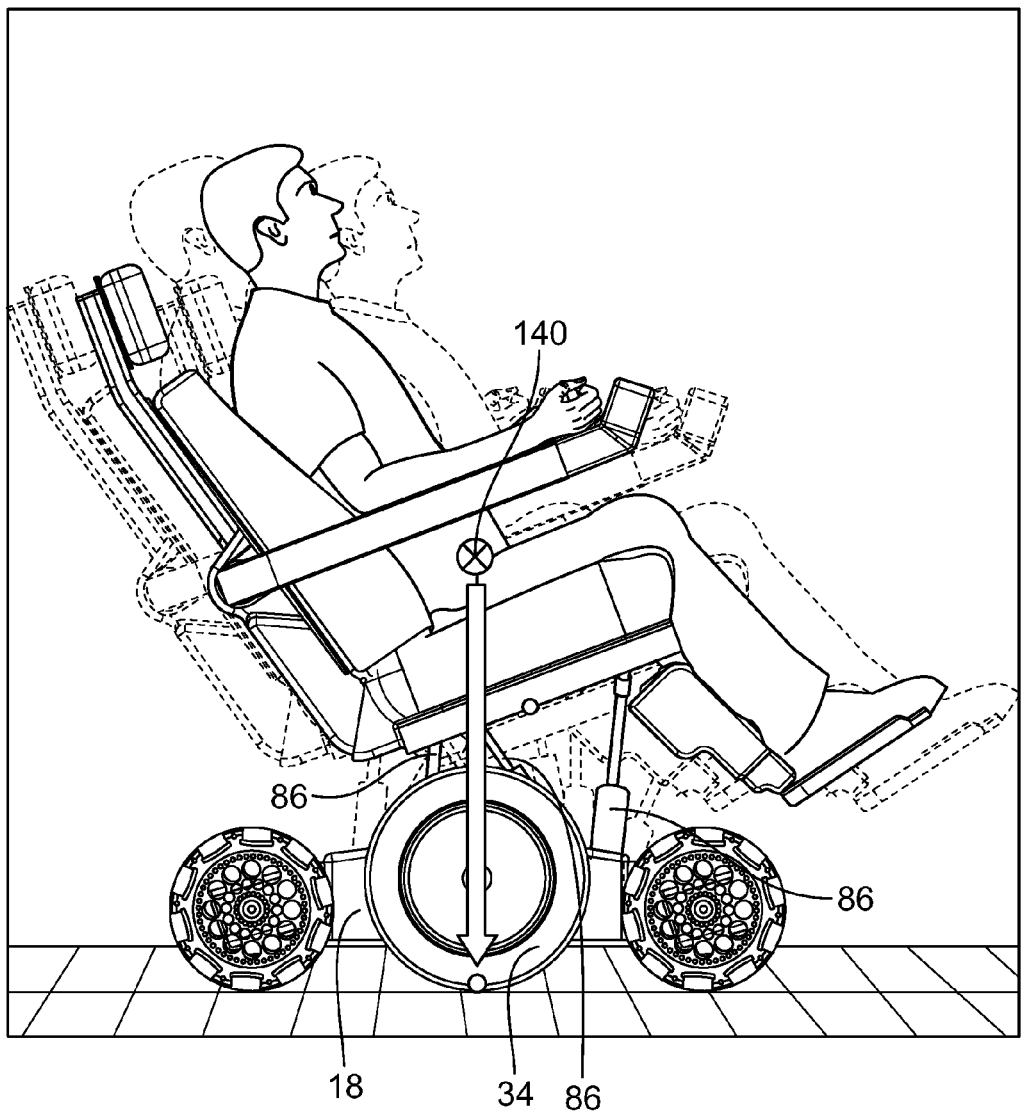
FIG. 16 illustrates a side view of the wheelchair of FIG. 14 with the tilted seat assembly moving linearly forward and backward.

For example, if the wheelchair 10 goes down a ten degree slope, the IMU chip 134 detects the change in the orientation of the base assembly 18 of the wheelchair 10 and sends information to the processor 114 indicating that the orientation of the base assembly 18 has rotated downward (shown in the direction of Arrow C) ten degrees along the Z-axis. Based on this information, the processor 114 then sends a signal to the actuator control 122 to move the actuators 86 such that the base 46 of the seat assembly 14 is rotated ten degrees backwards about the Z-axis (shown in the direction of Arrow D) to compensate for the ten degree downward slope. As shown in FIG. 15, this backward rotation of the seat assembly 14 moves the CG 140 of the user and seat assembly 14 to a position above the rear of the drive wheels 34. Referring to FIG. 16, in order to correct for the change in the position of the CG 140 due to rotating the seat assembly 14 back ten degrees, the processor 114 (FIG. 5) causes the actuators 86 to perform the steps of moving the seat assembly 14 linearly forward and then linearly backward so that the base assembly 18 tips forward and backward. The IMU 134 (FIG. 5) monitors the positions of the base assembly 18 during the forward and backward tipping movements, and this information is used by the processor 114 to again determine the point that the CG 140 is located directly above the center of the drive wheels 34. The processor 114 then moves the seat assembly 14 such that the CG 140 is located directly above the center of the drive wheels 34. Thus, the X-axis component of the CG 140 is located over the center of the drive wheels 34.

The computer system 110 of the wheelchair 10 also locates the Y-axis component of the CG. The Y-axis component of the CG is determined by adding the height from the point where the drive wheels 34 touch the ground to the seat tilt pivot location to the height from the tilt pivot location to the CG. The height from the tilt pivot location to the CG can be calculated according to the following equation, which uses the sine of the tilt angle and the translational shift distance required to re-balance the CG over the drive wheels 34:

$$CG_y = y_{g\text{-}p} + y_{p\text{-}CG} = y_{g\text{-}p} + x_{shift} \sin^{-1}(\theta_{tilt}).$$

While the wheelchair shown in the figures uses a mid-wheel drive power wheelchair base, embodiments of the present invention are not limited to such a base. For example, the seat assembly 14 and actuator assembly 42 could be used with a front-wheel drive power base or a rear-wheel drive power base. The adjustable seat assembly 14 could be moved by the actuator assembly 42 to adjust the position of the seat assembly 14 with six degrees of freedom with respect to the front or rear wheel drive power base. In addition, the seat assembly 14 can be moved by the actuator assembly 42 backward and forward with respect to the front or rear wheel drive power base to determine the CG of the seat assembly 14 and to move the CG to a desirable position with respect the drive wheels of the front or rear wheel drive power base. By way of example only, and with respect to a front wheel drive power wheelchair base, the CG could be moved to a position that is 20% of the distance from the front drive wheels to the rear caster wheels.

The various embodiments of the present inventions provide many advantages over conventional power wheelchair seating systems. By connecting the seat assembly to a six actuator assembly mounted to the base assembly, the seat assembly has six degrees of freedom with respect to the base assembly. Such freedom of movement allows for the user to adjust the position of the seat assembly to a desirable orientation (such as an upright position with the CG located over the center of the drive wheels) even though the wheelchair is traversing uneven terrain or obstacles. Alternatively, the actuator assembly can be used provide fewer than six degrees of movement for the seat assembly. By way of example only, the actuator assembly may provide four degrees of movement for the seat assembly. In addition, the wheelchair is configured to detect a change in the orientation of the base assembly as the wheelchair traverses uneven terrain or an obstacle and use that information to automatically adjust the orientation of the seat assembly via the actuators so that the seat assembly is in a desirable orientation with respect to the ground. The wheelchair is also configured to use an orientation detecting device with the actuators to find the CG of the seat assembly and user by linearly moving the seat assembly backward and forward over the drive wheels until the CG is located and positioned over the center of the drive wheels.

While various spatial and directional terms, such as top, bottom, lower, mid, lateral, horizontal, vertical, front and the like may used to describe embodiments of the present invention, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

The invention claimed is:

1. A method for adjusting a position of a wheelchair seat assembly, comprising:
   providing a wheelchair including:
   a base assembly including a first side and a second side, wherein on each of said first and second sides is mounted a caster and a drive wheel;
   a seat assembly;
   a plurality of actuators connected to said base assembly and said seat assembly, wherein said actuators provide said seat assembly with at least four degrees of movement with respect to said base assembly;
   a computer that is connected to said actuators; and
   a detector that measures an orientation of said base assembly;
   determining a default orientation for said seat assembly for a user that is based on a center of gravity of a specific user and said seat assembly when the user is in said seat assembly, said determining step including:
   positioning the user in said seat assembly;
   moving said actuators at a command of said computer such that said seat assembly moves linearly forward with respect to said base assembly and tips forward;
   measuring a first change in the orientation of said base assembly due to a forward tipping caused by the forward movement with said detector;
   moving said actuators at a command of said computer such that said seat assembly moves linearly backward with respect to said base assembly and tips backward;
   measuring a second change in the orientation of said base assembly due to a backward tipping caused by backward movement with said detector;
   sending the measurements of the first and second changes in orientation of said base assembly to said computer;
   based on said measurements of said first and second changes in orientation of said base assembly, said computer determines a location for said seat assembly where the center of gravity of said seat assembly and the user is positioned approximately above a center of drive wheels; and
   moving said seat assembly to said default orientation by moving said actuators such that said seat assembly is moved to said location.

2. The method of claim 1, further including indicating to the user that the default orientation of the seat assembly needs to be recalibrated.

3. A method for adjusting a position of a wheelchair seat assembly, comprising:
   providing a wheelchair including:
   a base assembly including a first side and a second side, wherein on each of said first and second sides is mounted a caster and a drive wheel;
   a seat assembly;
   a plurality of actuators connected to said base assembly and said seat assembly, wherein said actuators provide said seat assembly with at least four degrees of movement with respect to said base assembly;
   a computer that is connected to said actuators; and
   a detector that measures an orientation of said base assembly and that is connected to said computer;
   moving drive wheels to drive said wheelchair over terrain;
   measuring the orientation of the base assembly with the detector as the wheelchair moves over the terrain; and,
   when the orientation of said base assembly changes by rotating a first direction around an axis by a certain number of degrees due to a change in slope of the terrain, sending information regarding the change in orientation along said axis by said certain number of degrees from said detector to said computer;
   based on the information regarding the change in orientation of said base assembly along said axis by said certain number of degrees, calculating with the computer how to adjust the position of the seat assembly to compensate for the change in the orientation of the base assembly; and
   based on those calculations, automatically moving said actuators at a command of said computer to move the seat assembly to adjust an orientation of the seat assembly with respect to said base assembly to compensate for the change in the orientation of said base assembly by rotating said seat assembly in a second direction that is opposite said first direction along said axis by said certain number of degrees.

4. The method of claim 3, wherein said step of providing said seat assembly with at least four degrees of movement with respect to said base assembly includes positioning said seat assembly at a home orientation with respect to the ground.

5. The method of claim 4, wherein and said step of moving said actuators at the command of said computer to adjust the orientation of the seat assembly to compensate for the change in the orientation of said base assembly includes moving said seat assembly back to said home orientation if the change in orientation of said base assembly causes a change in the orientation of said seat assembly.

* * * * *